March 13, 1962 E. MARRA 3,024,917
HYDRAULIC DERRICK
Filed April 7, 1959 3 Sheets-Sheet 1
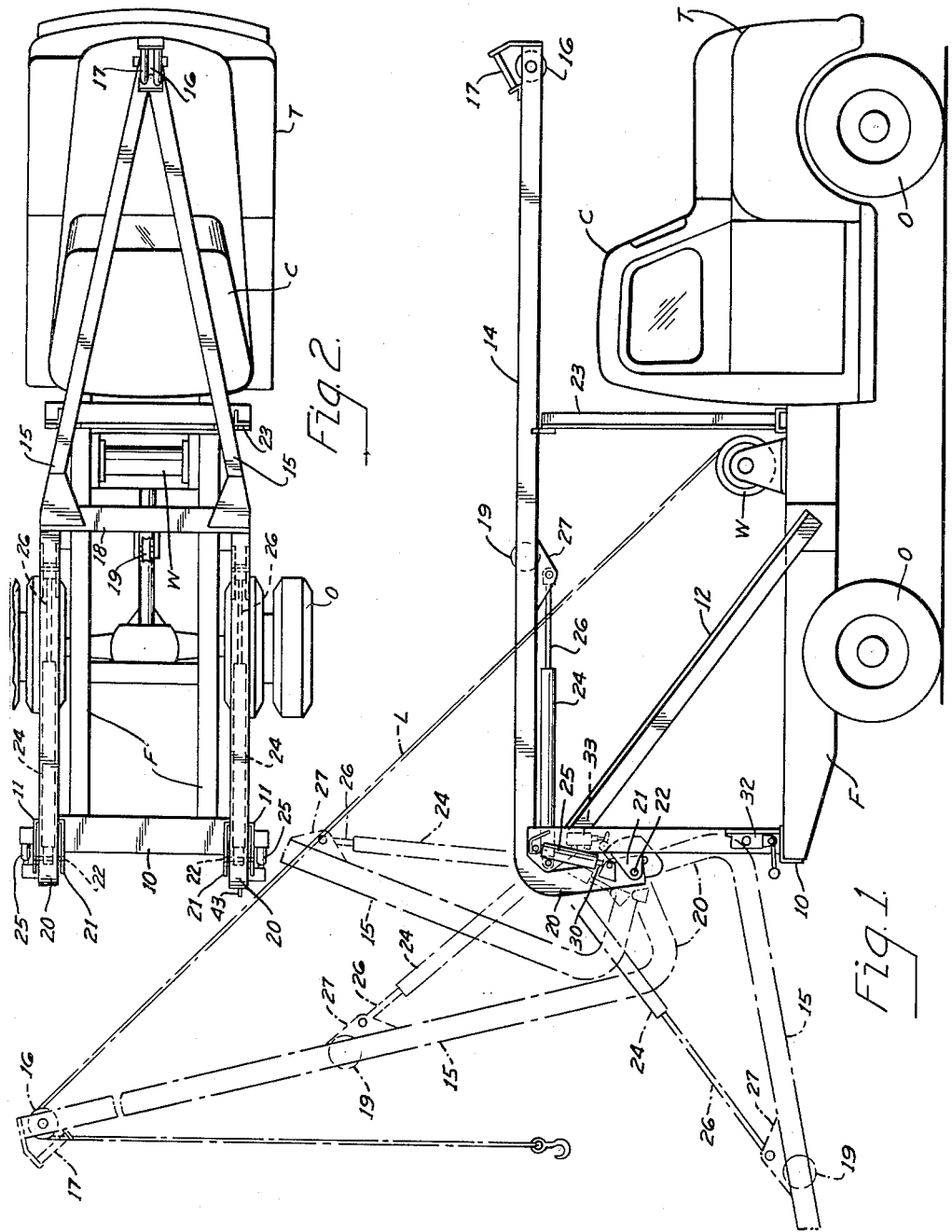
INVENTOR.
EVERETT MARRA
BY Bosworth, Sessions, Herndon & Knowles
ATTORNEYS.

March 13, 1962 E. MARRA 3,024,917
HYDRAULIC DERRICK

Filed April 7, 1959 3 Sheets-Sheet 2

INVENTOR.
EVERETT MARRA
BY
ATTORNEYS.

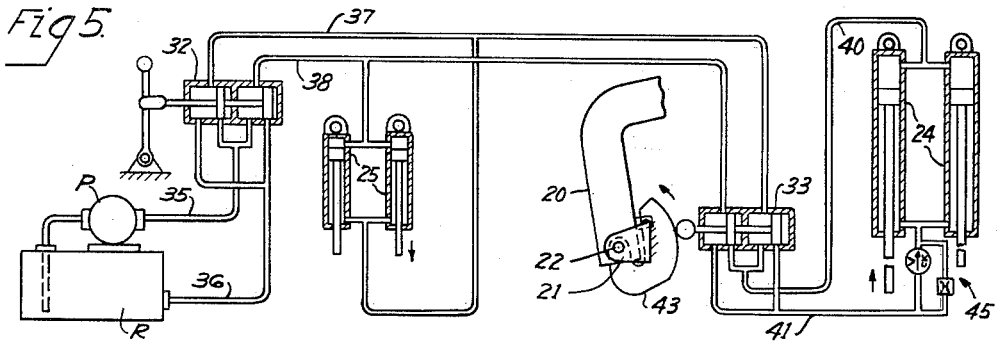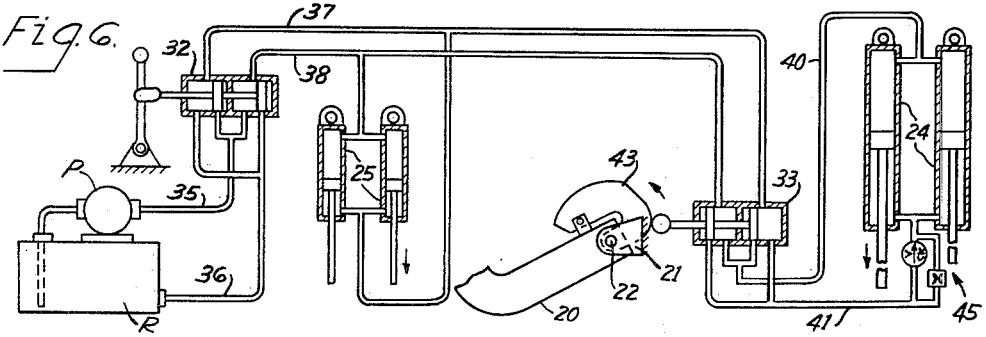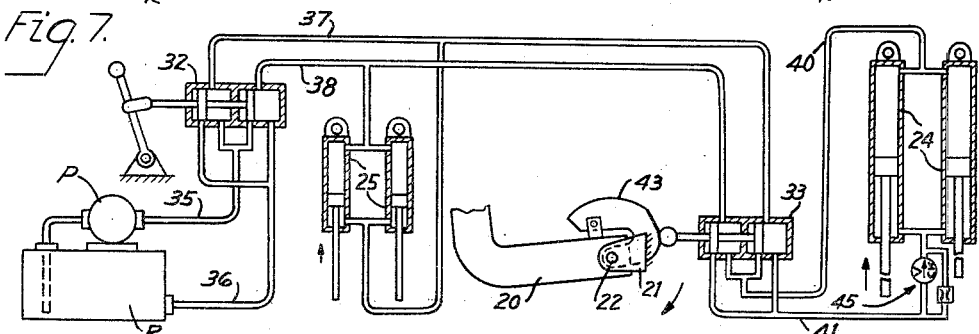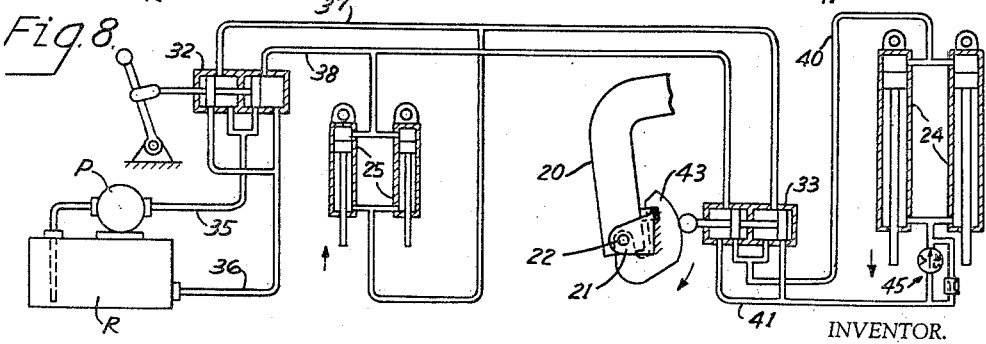
INVENTOR.
EVERETT MARRA
BY
ATTORNEYS.

United States Patent Office 3,024,917
Patented Mar. 13, 1962

3,024,917
HYDRAULIC DERRICK
Everett Marra, Lakewood, Ohio, assignor to Stahl Metal Products, Inc., Cleveland, Ohio, a corporation of Ohio
Filed Apr. 7, 1959, Ser. No. 804,761
8 Claims. (Cl. 212—8)

This invention relates to portable derricks and particularly to hydraulically positioned derricks mounted on motor vehicles.

Various derrick or boom structures are commonly used in conjunction with trucks or other suitable vehicles in various industries. In the telephone service and electric power service fields, for example, line construction and maintenance trucks are generally equipped with a derrick or a boom and a drum winch driven through a power take-off from the vehicle's engine. Such devices are employed to handle heavy equipment such as transformers and line construction poles in the erection and maintenance of telephone and electric power pole lines and outside plant.

Such derricks are mounted on one end of a truck in such a manner that the boom may assume various "work" positions, rearwardly or forwardly and upwardly or substantially horizontally from the truck. In addition, the derricks are generally mounted in a manner that permits the boom to be transported in a horizontal "transport" position on top of and substantially within the major dimensions of the trucks on which they are mounted.

One of the objects of my invention is to provide a derrick that may be mounted on one end of a truck or motor vehicle and having a derrick boom that may be moved through 180° or more in a vertical plane from a substantially horizontal transport position in which it extends forwardly along the top of the truck through various working positions upwardly and outwardly from the truck to a rearward and substantially horizontal work position. An additional object is to provide a derrick having a boom whose outer end can be positioned close to the ground and below the level of the bed of the truck upon which the derrick is mounted. Another object is to provide a derrick that may be mounted on a conventional truck chassis by the addition of a few fixed structural elements without encroaching upon the usable space and normal functions of the truck and truck body. A further object of my invention is to provide such a derrick having a boom of fixed length that extends unbroken and unjointed from a fixed pivotal mounting point on the truck to the working sheave at the outer end of the boom. Another of my objects is to provide a derrick for mounting on the rear end of a utility truck and having a boom that permits unobstructed access to the truck bed from above or behind the truck and which is adapted to transfer loads onto and off the truck bed through the rear opening in the body. Still another object of my invention is to provide a derrick having a novel hydraulic system employing hydraulic cylinders in cooperating pairs for safety controlling and moving the boom through its entire range of positions.

Briefly, I accomplish the foregoing objects by providing a derrick having a boom comprising two legs pivotally connected at one end to laterally spaced vertical stanchions mounted on one end of the truck chassis. Cooperating pairs of double-acting hydraulic cylinders act between fixed pivotal connections near the upper end of the vertical stanchions and pivotal connections on and movable with the boom. The pivotal connection point of the boom to the stanchions is substantially below the top of the stanchions and, thus, is vertically separated from the fixed pivotal connection points of the hydraulic cylinders near the upper end of the stanchions. In order to provide this relationship between the various pivot points on the vertical stanchions, both legs of the boom are bent through approximately 90° in order to allow the boom to assume a horizontal transport position on top of the truck. This bend in the boom produces an offset of the boom pivot point from the longitudinal axis of the major portion of the boom length which aids in positioning the free end of the boom close to the ground in its extreme rearward position. In this manner, I am able to provide the necessary separation of the boom pivotal connection and the various fixed pixotal connections of the hydraulic cylinders along the vertical stanchions so as to avoid the additional space consuming structures that are necessary when these pivot points are horizontally or diagonally spaced apart near one end of the truck. In addition, the boom is movable throughout a range of 180° or more without requiring any auxiliary links or additional pivotal joints.

Thus, my invention provides a simple, sturdy and efficient derrick having a minimum of pivotal connections and linkage. Also, it is easily and conveniently mounted on a line construction truck, for example, with a minimum of additional structure and modification of the utility body and without interference with its use. A full understanding of my invention may be gained through the following description together with the drawings in which:

FIGURE 1 is a side elevation of the derrick of my invention mounted on a truck cab and chassis showing the boom in the transport position with various working positions of the boom indicated by broken lines;

FIGURE 2 is a top view of the truck mounted derrick of my invention seen in FIGURE 1;

Figure 4:
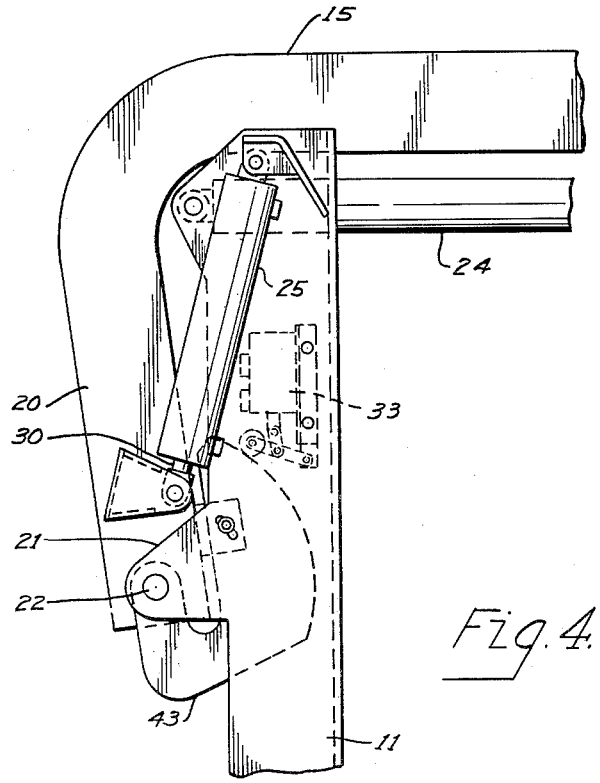

FIGURE 4 is a fragmentary view in enlarged scale showing details of the derrick boom and actuating cylinder pivot points and a cam operated hydraulic valve associated with the hydraulic system of my invention; and FIGURES 5, 6, 7 and 8 are schematic representations of the hydraulic system in which the control valves and hydraulic cylinders are sectioned to show the piston positions under various conditions of operation of the derrick.

Figure 3:
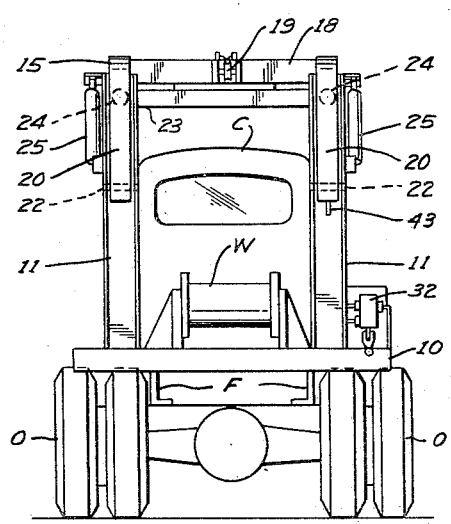
FIGURE 3 is a rear view of the truck mounted derrick seen in FIGURE 1.

FIGURES 1, 2 and 3 show a preferred form of the derrick embodying my invention mounted on the rear end of a conventional truck T having a frame or chassis F mounted in a conventional manner on wheels O, a forwardly mouted cab C and a conventional engine driven winch W mounted behind the cab C for controlling winch line L. The fixed mounting structure for the derrick consists of a base member 10, two vertical stanchions 11 and bracing members 12. Base member 10 preferably is an angle fixed across the ends of the frame F of the chassis of truck T to provide a mounting base for the vertical stanchions 11. The stanchions 11 are formed of channels mounted on the base member 10 and extend upwardly approximately to the level at which it is desired to carry the boom in transport position. Bracing members 12 extend diagonally from a point near the top of each of the stanchions 11 to the frame F of the truck T to brace the stanchions 11.

The boom 14, in its preferred form, is of the well-known A frame configuration and is fabricated of rectangular steel tubing. The boom may be fabricated entirely or in part of other well-known structural shapes such as angles or channels. The boom 14 has two side members or legs 15 which are connected together at one end to support a working sheave 16 and associated winch line guides 17. The two side members 15 extend longitudinally from the working sheave 16 diverging for approximately half their length at which point they continue to extend in parallel relationship to each other. A cross member 18 extends between the two side members 15 at the point where they become parallel. An auxiliary working sheave 19 is attached to cross member 18. When used with winch line L and winch W, it provides an effectively shorter and more powerful boom than sheave 16 and permits the safe handling and loading of heavy equipment onto and off of the bed of the truck. Each of the legs 15 are angled or bent through approximately 90° to form an angled end portion 20. The free end of each of angled end portions 20 of the legs 15 is pivotally connected by a pivot pin 22 to lugs 21 that extend rearwardly from the vertical stanchions 11 at points below their upper ends. The location of this pivotal connection on the stanchions together with the bend in pivoted ends of legs 15 allows the boom 14 to pivot forwardly to a horizontal transport position indicated by the solid lines in FIGURES 1 to 3 on the top of the truck. A support 23 is provided behind and above the cab C to support the boom in the transport position.

Associated with each leg 15 of the boom are two double-acting hydraulic cylinders 24 and 25 that cooperate to position the boom 14 throughout its range of operation. The piston rod 26 of each of the cylinders 24 is pivotally connected to a lug 27 mounted on the legs 15 at a point near the cross member 18 while the closed end of each cylinder 24 is pivotally connected to one of the vertical stanchions 11 at a point near its upper end. The piston rod 30 of each of hydraulic cylinders 25 is pivotally connected to the angled portion 20 of one of the legs 15. The closed end of each of the cylinders 25 is pivotally connected to the top of a vertical stanchion 11 near its upper end.

When the boom 14 is in the transport position, each cylinder 24 is approximately half extended and lies along its associated leg 15 while cylinders 25 are almost completely retracted. By means of a control system to be described below, the cylinders can be made to raise the boom 14 from the transport position shown by solid lines in FIGURES 1, 2 and 3 to and through the various work positions shown in broken lines in FIGURE 1.

It will be noted that, as exemplified by the preferred embodiment of my invention, I provide a boom of fixed length that is solid and unjointed between its working sheave and its fixed pivotal connection with the mounting structure of the derrick. The boom 14 is directly pivotally connected to the stationary vertical stanchions 11 and does not require or employ auxiliary arms, links or pivotal connections to reach the transport or various working positions. In addition, the hydraulic operating cylinders each have one end pivotally connected to the same vertical stanchions 11 upon which the boom 14 is pivotally mounted so that the fixed mounting structure attached to the conventional truck T is of simple construction and minimum in amount. The mounting superstructure does not encroach upon the bed space or bin space of a conventional truck body nor interfere with the body's conventional uses. Also, as clearly shown in FIGURES 2 and 3, the boom configuration does not interfere with access to the truck bed through the rear or top open sides of the body.

It will be apparent to one skilled in the art that the boom may be mounted on the forward end of the truck to provide working positions forwardly and upwardly of the truck comparable to those working positions shown in FIGURE 1 at the rear end of the truck by simple modifications of the mounting superstructure comprised of base member 10, vertical stanchions 11 and bracing members 12. It is also apparent that this invention comprehends a boom having but a single leg 15 pivotally connected to one vertical stanchion 11 and adapted to be positioned by a single pair of cooperating hydraulic cylinders 24 and 25.

As stated before, the boom 14 is positioned by a cooperating pair of double-acting hydraulic cylinders 24 and 25 associated with each leg 15. When the boom 14 is in the transport position, each cylinder 24 is partially extended and each cylinder 25 is substantially retracted. As the boom 14 is raised from the transport position, each cylinder 24 retracts and each cylinder 25 extends. When the boom 14 reaches an upward position so that the axis of each cylinder 24, if extended, would pass through pivot pins 22 of the main pivotal connection of each side member 15 with the stanchions 11, cylinders 24 are substantially retracted and cylinders 25 are approximately half extended. As boom 14 is moved outwardly from this position, each cylinder 24 begins to extend and each cylinder 25 continues to extend. When boom 14 is extended rearwardly from the truck in its lowermost working position, both cylinders 24 and both cylinders 25 are substantially fully extended.

The winch line L is usually reeved through working sheave 16 and the associated line guides 17 for maximum reach in any of the various working positions of boom 14. The winch line L may be reeved through auxiliary sheave 19 when a shorter, more powerful boom is required and especially when it is desired to transfer loads from the ground to the bed of the truck and vice versa. This latter function is possible through the use of auxiliary sheave 19 because the space below cross member 18 to which sheave 19 is attached and between legs 15 is entirely unobstructed.

For example, when a load standing on the ground is to be moved onto the truck, the boom is positioned so that winch line L reeved through auxiliary sheave 19 hangs vertically above the load. The load is attached to winch line L and raised above the ground to a level higher than the bed of the truck. The boom is then moved forwardly swinging the load between the legs 15 and through the open back side of the truck to a position from which it can be lowered by winch line L onto the bed. A load can similarly be transferred from the truck to the ground. If working sheave 16 were employed in this manner, the winch line would encounter cross member 18 as the boom 14 was removed forwardly of a vertical position. Also, heavier loads can be transferred by the boom when using auxiliary sheave 19 because the load acts on a relatively shorter lever arm.

Therefore, in order to raise or to lower the boom 14 throughout its full range of movement, each cylinder 24 must be controlled to act in one direction through part of the range and then, at the proper position of the boom, to act in the other direction through the remainder of the range while the cylinders 25 act in only one direction throughout the same range of movement. The cylinders are supplied with the fluid under pressure necessary to accomplish this by a novel hydraulic control system, a preferred form of which is schematically shown under various conditions of operation in FIGURES 5 through 8. The hydraulic system comprises a pump P, driven from the conventional power take-off of the truck or by other appropriate power means and supplied with fluid from reservoir R, a manually operated selector valve 32, an automatically operated selector valve 33, double-acting hydraulic cylinders 24 and 25 of conventional construction and the necessary connecting conduits. The selector valves 32 and 33 are shown as conventional double chambered slide valves having a piston valve in each chamber connected in tandem and arranged to reverse the connection between two pairs of conduit lines. The use of any hydraulic valves able to accomplish a reversal of connection between two pairs of conduits is comprehended by this invention, however.

The supply conduit 35 from pump P and the return conduit 36 to reservoir R are both connected to each chamber of the double-chambered manually operated selector valve 32. Also connected to one chamber of selector valve 32 is a conduit 37 connected to one end of each of cylinders 25 and to one chamber of the double-chambered automatically operated selector valve 33. Another conduit 38 is connected between the other chamber of selector valve 32 and the other end of cylinders 25 and the other chamber of automatically operated selector valve 33. Thus, cylinders 25 and automatic selector valve 33 form a parallel combination reversibly connected by means of valve 32 in circuit with the pump P.

Conduits 40 and 41 are each connected between one end of cylinders 24 and both chambers of automatic valve 33. Cylinders 24 thus form a second parallel combination reversibly connected by means of automatic valve 33 to conduits 37 and 38.

The valve 33 is preferably operatively engaged and positioned by a cam 43 rigidly mounted on one leg 15 of the boom for rotation about pivot pin 22 with the boom 14 for automatic control of cylinders 24 in accordance with the position of the boom. Suitable means, such as a spring, may be provided to urge the tandem pistons and piston rod of valve 33 to the left against cam 43 as seen in FIGURES 5 through 8. The hydraulic control system described above is therefore able to direct the flow of fluid from pump P to either end of double-acting hydraulic cylinders 25 and to either chamber of automatic selector valve 33 which in turn directs the flow of fluid to either end of double-acting hydraulic cylinders 24.

As shown in FIGURES 1 and 3, selector valve 32 is mounted at the rear of the truck adjacent one of the vertical stanchions 11. The valve is preferably located here so that the operator can see the boom and its load when operating the boom. The automatically operated selector valve 33, as shown in FIGURES 1 and 4, is mounted in a protected position in the channel bottom of one of the vertical stanchions 11 adjacent the point of pivotal connection of a side leg 15 and stanchions 11 for engagement by cam 43.

The hydraulic control system described above may be appropriately modified in a manner that will be apparent to anyone skilled in the art if this invention is practiced in the form of a boom having a single leg 15 positioned by a single set of cooperating cylinders 24 and 25.

The operation of the hydraulic control system can be most easily understood in connection with FIGURES 5 through 8. In these figures, the selector valves and hydraulic cylinders are shown in section to reveal the position of their pistons under various operating conditions. In each figure, cam 43 and a fragment of pivotally connected end of a side leg 15 is shown in those positions corresponding to the hydraulic valve and cylinder piston positions shown. FIGURE 5 shows the system when the boom 14 is being raised from the transport position. Selector valve 32 is positioned to direct fluid to extend the almost fully retracted hydraulic cylinders 25. Automatic selector valve 33 is positioned by engagement with cam 43 to direct fluid to retract the partially extended hydraulic cylinders 25.

With the manual selector valve 32 in the same position, the boom continues to rise until the arcuate cam 43 associated with the boom 14 disengages automatic selector valve 33 to reverse the fluid connections to hydraulic cylinders 25 so that they stop contracting and begin extending. FIGURE 6 is an example of this condition of operation and shows the boom approximately in a vertical position with the automatic selector valve 33 disengaged by arcuate cam 43.

FIGURES 7 and 8 show the valves, cylinders, boom and cam as they appear when the boom is being lowered to the transport position from a working position rearwardly of the truck. Initially, fluid from the pump is directed by valve 32 to hydraulic cylinders 24 to retract them and by valve 33 not yet engaged by cam 43 to hydraulic cylinders 25 to retract them.

When the boom being lowered to the transport position passes that position where the action of hydraulic cylinders 24 must be reversed, cam 43 engages automatic valve 33 reversing the fluid connections to the ends of these cylinders so that they extend. Figure 8 illustrates this condition of operation and shows the boom being lowered and approaching the transport position.

The manual selector valve 32 may assume an "off" position between the "raise" position shown in FIGURES 5 and 6 and the "lower" position shown in FIGURES 7 and 8 so that its pistons block the conduits leading to hydraulic cylinders 25 and automatic selector valve 33 and effectively fix the position of the boom. Additional features may be provided such as hand shut-off valves adjacent the working hydraulic cylinders in order to lock them in a fixed position without exerting high pressures in the conduit lines.

Also, unidirectional restrictions may be positioned in the conduit lines leading to the hydraulic cylinders 24 to restrict the flow of fluid from or to them as desired so that the weight of the boom acting on the cylinders will not, for example, cause the boom to drop too fast onto the boom rack. For example, FIGURES 5 through 8 show the placement of means indicated generally at 45 and comprising a one-way check valve and restricted bypass for unidirectionally restricting the flow of fluid from the piston rod end of cylinders 24 to accomplish the desired cushioning of the movement of boom 14 when it is being lowered from a substantially vertical position to or toward either of its horizontal positions. I prefer to place the unidirectional restriction 45 in that conduit carrying fluid away from cylinder 24 during its extension though the unidirectional restriction 45 may be placed in that conduit supplying fluid to cylinder 24 during its extension and substantially accomplish the same object. The use of such a means as unidirectional restriction 45 to cushion the lowering of boom 14 from its vertical position is possible because of the reversal of action of cylinder 24 when the boom passes the vertical position.

Those skilled in the art will appreciate that various other changes and modifications can be made in the preferred form of apparatus described herein without departing from the spirit and scope of the invention.

I claim:

1. A derrick comprising a boom of fixed length having an approximately 90° bend intermediate its ends, a cooperating pair of hydraulic cylinders and a hydraulic system for controlling said cylinders, said boom having one end pivotally connected at a fixed point for swinging movement in a vertical plane about said point of pivotal connection, the other end of said boom being free, one of said cylinders having one end pivotally connected at a fixed point that is substantially vertically spaced apart from said fixed point of pivotal connection of said boom and the other end pivotally connected to said boom at a point between said bend and one of its ends, the other of said cylinders having one end pivotally connected at a fixed point that is substantially vertically spaced apart from the point of pivotal connection of said boom and the other end pivotally connected to said boom at a point between said bend and the other of its ends and said hydraulic control and supply system connected to said cylinders whereby said cylinders are caused to act between fixed pivotal connection points and said boom to position said boom with respect to said fixed points.

2. A derrick comprising a boom of fixed length having an approximately 90° bend intermediate its ends, and cooperating first and second hydraulic cylinders, said boom having one end pivotally connected at a fixed point for swinging movement in a vertical plane about said point of pivotal connection and adapted to extend substantially horizontally from said point in either of two opposite directions, said boom having its other end free, said first cylinder having one end pivotally connected to a fixed point that is substantially vertically spaced apart from the point of pivotal connection of said boom and the other end pivotally connected to said boom at a point between said bend and its pivotally connected end, said first cylinder adapted to act in one direction when cooperating with said second cylinder to position said boom from one of its horizontal positions to the other of its horizontal positions, said second cylinder having one end pivotally connected to a fixed point at a point that is substantially vertically spaced apart from the point of pivotal connection of said boom and having the other end pivotally connected to said boom at a point intermediate said bend and the free end of said boom, said second cylinder adapted to act successively in opposite directions when cooperating with said first cylinder to position said boom from one of its horizontal positions to the other of its horizontal positions.

3. A derrick according to claim 2 in which said hydraulic control system comprises a hydraulic pump, a first and a second valve means, a supply and return conduit connecting said pump and said first valve means, first conduits connecting said first cylinder and said second valve means in parallel combination with said first valve means, said first valve means adapted to connect either end of the parallel combination to said supply conduit from said pump and the other end of the parallel combination to said return conduit whereby said first cylinder acts in one of two directions, and second conduits connecting said second cylinder in parallel with said second valve means, said second valve means adapted to connect either end of said second cylinder to one of said first conduits and the other end of said second cylinder to the other of said first conduits, whereby said second cylinder acts in either of two directions while its cooperating first cylinder acts in one of two directions.

4. A derrick comprising a fixed, substantially vertical stanchion, a boom of fixed length having an approximately 90° bend intermediate its ends, cooperating first and second hydraulic cylinders and a hydraulic system for controlling a supply of fluid to said cylinders, said boom having one end pivotally connected to said fixed stanchion for swinging movement in a vertical plane about said pivotal connection and adapted to extend substantially horizontally from said stanchion in either of two opposite directions, said boom having its other end free, said first cylinder having one end pivotally connected to said fixed stanchion at a point substantially vertically spaced apart from the point of pivotal connection of said boom to said stanchion and the other end pivotally connected to said boom at a point between said bend and its pivotally connected end, said first cylinder adapted to act in one direction when cooperating with said second cylinder to position said boom from one of its horizontal positions to the other of its horizontal positions, said second cylinder having one end pivotally connected to said fixed stanchion at a point substantially vertically spaced apart from the point of pivotal connection of said boom to said stanchion and having the other end pivotally connected to said boom at a point intermediate said bend and the free end of said boom, said second cylinder being adapted to act successively in opposite directions when cooperating with said first cylinder to position said boom from one of its horizontal positions to the other of its horizontal positions and said hydraulic control system connected to said first and second cylinders whereby fluid is supplied to one end of said first cylinder and successively to both ends of said second cylinder when said cylinders are cooperating to position said boom from one of its horizontal positions to the other.

5. A derrick according to claim 4 in which said hydraulic control system comprises a hydraulic pump, a first and a second valve means, a supply and return conduit connecting said pump and said first valve means, first conduits connecting said first cylinder and said second valve means in parallel combination with said first valve means, said first valve means adapted to connect either end of the parallel combination to said supply conduit from said pump and the other end of the parallel combination to said return conduit whereby said first cylinder acts in one of two directions, and second conduits connecting said second cylinder in parallel with said second valve means, said second valve means adapted to connect either end of said second cylinder to one of said first conduits and the other end of said second cylinder to the other of said first conduits, whereby said second cylinder acts in either of two directions while its cooperating first cylinder acts in one of two directions.

6. A derrick according to claim 5 having a hydraulic control system that includes a cam associated with said boom to automatically actuate said second valve means in accordance with the position of said boom.

7. A derrick comprising a pair of laterally spaced apart fixed vertical stanchions, a boom of fixed length comprising two converging legs each having an approximately 90° bend at laterally aligned points intermediate their ends, a cooperating pair of first and second hydraulic cylinders associated with each of said legs, the converging ends of said legs being connected together and the diverging ends of said legs each being pivotally connected to one of said fixed stanchions at laterally aligned pivot points for swinging movement of said boom in a substantially vertical plane about said pivotal connections and adapted to extend substantially horizontally of said stanchions in either of two opposite directions, said first cylinders each having one end pivotally connected to one of said stanchions at a point substantially vertically spaced apart from the point of pivotal connection of its associated leg and the other end pivotally connected to its associated leg at a point between said bend and its pivotally connected end, said first cylinders adapted to act in one direction when cooperating with said second cylinders to position said boom from one of its horizontal positions to the other of its horizontal positions, said second cylinders each having one end pivotally connected to one of said stanchions at a point substantially vertically spaced apart from the point of pivotal connection of its associated leg and the other end pivotally connected to its associated leg at a point between said bend and its converging end, said second cylinders adapted to act successively in opposite directions when cooperating with said first cylinders to position said boom from one of its horizontal positions to the other of its horizontal positions.

8. A derrick comprising a pair of laterally spaced apart fixed, substantially vertical stanchions, a boom of fixed length comprising two converging legs each having an approximately 90° bend at laterally aligned points intermediate their ends, a cooperating pair of first and second hydraulic cylinders associated with each of said legs and a hydraulic system for controlling a supply of fluid to the cylinders, the converging ends of said legs being connected together and the diverging ends of said legs each being pivotally connected to one of said fixed stanchions at laterally aligned pivot points for swinging movement of said boom in a substantially vertical plane about said pivotal connections, said boom being adapted to extend substantially horizontally of said stanchions in either of two opposite directions, the other end of said boom being free, said first cylinders each having one end pivotally connected to one of said fixed stanchions at a point substantially vertically spaced apart from the point of pivotal connection of its associated leg with one of said stanchions and the other end pivotally connected to its associated leg at a point between said bend and its pivotally connected end, said first cylinders each adapted to act in one direction when cooperating with said second cylinders to position said boom from one of its horizontal positions to the other of its horizontal positions, said second cylinders each having one end pivotally connected to one of said fixed stanchions at a point substantially vertically spaced apart from the point of pivotal connection of its associated leg to said stanchion and the other end pivotally connected to its associated leg at a point between said bend and its converging end, said second cylinders each adapted to act successively in opposite directions when cooperating with said first cylinders to position said boom from one of its horizontal positions to the other of its horizontal positions, and said hydraulic control system connected to said first and second cylinders whereby fluid is supplied to one end of said first cylinders and successively supplied to both ends of said second cylinders when said first and second cylinders when said first and second cylinders are cooperating to position said boom from one of its horizontal positions to the other.

References Cited in the file of this patent

UNITED STATES PATENTS

| | | |
|---|---|---|
| 2,353,655 | Day | July 18, 1944 |
| 2,575,262 | Eakin | Nov. 13, 1951 |
| 2,786,580 | Balogh | Mar. 26, 1957 |

FOREIGN PATENTS

| | | |
|---|---|---|
| 500,088 | Italy | Nov. 17, 1954 |